May 27, 1958     H. H. KUEFNER     2,835,994
MARKER
Filed Nov. 15, 1954
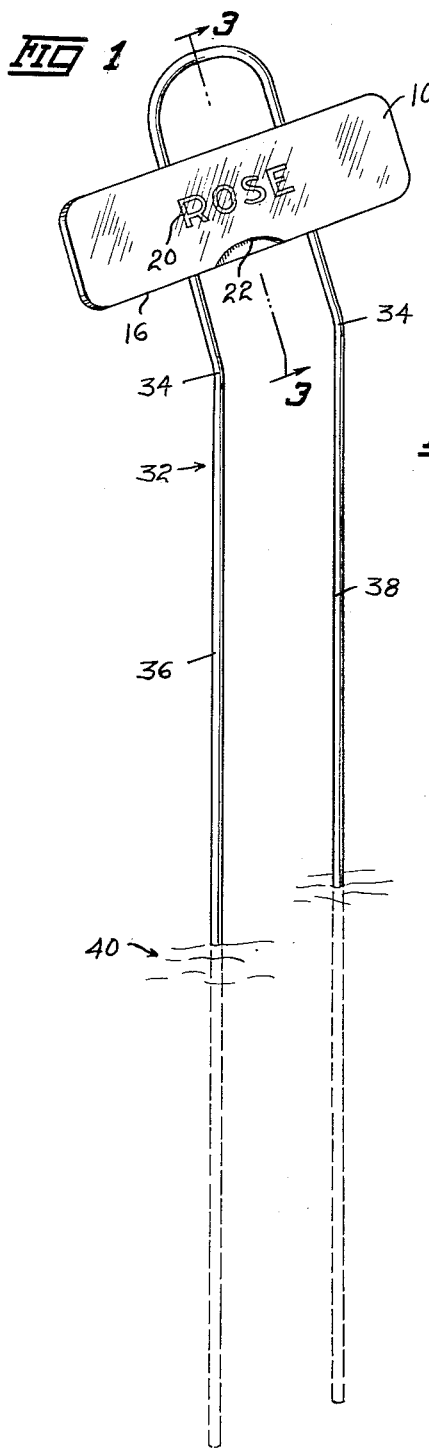
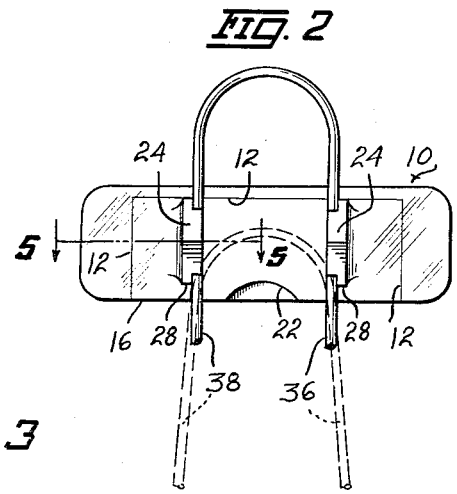
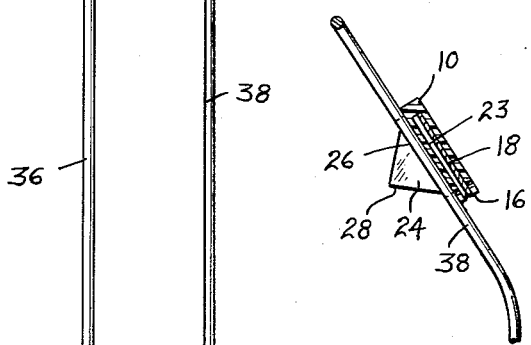
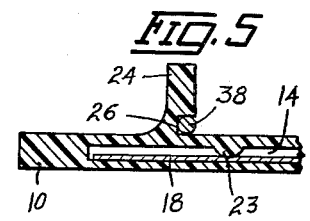
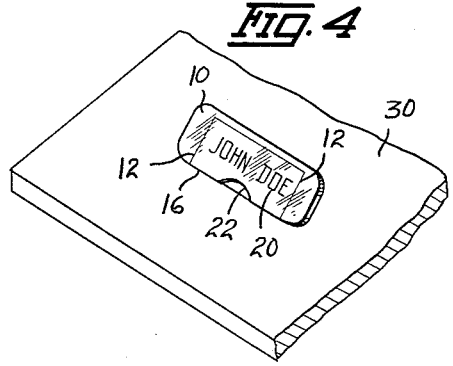
INVENTOR.
HERBERT H. KUEFNER
BY Talbert Dick & Adler
ATTORNEYS.

ary Patent Office 2,835,994
Patented May 27, 1958

2,835,994

MARKER

Herbert H. Kuefner, Des Moines, Iowa, assignor to The Herbert Company, Des Moines, Iowa Application November 15, 1954, Serial No. 468,632

3 Claims. (Cl. 40—10)

My invention relates to improvements in markers as may be used to identify different types or species of flowers and plants in gardens, greenhouses or the like or to identify place settings at table and is an improvement over my prior plant marker which is the subject of United States Patent No. 2,595,530.

In greenhouses where flowers, plants and the like are commercially produced, there are usually many varieties and species in various stages of growth. A suitable marker conspicuously placed for these different plants not only aids the producer in quick identification but is of considerable help to prospective purchasers who may be browsing among the planted rows. Such markers find utility also in private gardens and the like where a large variety of plants may be under cultivation. In an effort to fulfill the need for a marker of this kind, several types have been devised on which the indicia could be written or painted, but due to the fact that such markers are subject to the elements when out-of-doors and subject to water contact from sprinkling even indoors, the legibility of the indicia soon disappears. This problem was overcome in my patent 2,595,530 but due to certain practical problems in manufacturing, I have redesigned the marker and materially increased its usefulness and reduced its cost of manufacture.

One of the important objects of this invention is to provide a marker for plants, flowers and the like embodying a transparent member for holding identifying indicia that can be used with or without a flexible support.

A further object of this invention is to provide a marker of the above class in which the identifying indicia can be easily and quickly inserted or removed therefrom.

More specifically my invention concerns a flat transparent member having a pocket open only at the bottom for receiving a card with identifying indicia and a pair of spaced bearing members on the back that serve the double purpose of supporting the marker in upright position on a table, for example, or yieldingly retaining the closed end of an elongated hair pin shaped wire of which the free ends are designed for insertion in the soil.

A still further object of my invention is to provide a plant marker having the above mentioned characteristics that is economical in manufacture, simple in construction and efficient in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my new marker shown supported in the ground,

Fig. 2 is a rear elevational view of this marker showing the attachment of the wire support thereto, Fig. 3 is a cross sectional view taken on the line 3—3 of Fig. 1, Fig. 4 is a reduced perspective view of this marker shown in use without the wire holder on a table surface or the like, and Fig. 5 is an enlarged cross sectional view taken on the line 5—5 of Fig. 2.

Referring to the drawings, my marker or indicia holder designated by the numeral 10 is an elongated rectangular flat body member made from a suitable transparent material such as plastic or the like and is formed with an internal pocket, recess, slot or compartment 14 defined by the line 12 as seen in Fig. 2. This compartment or chamber 14 is closed on all sides except one and the open side communicates with what I have designated as the bottom 16 of the holder 10. Preferably, chamber 14 extends over the major area of the holder 10 and is designed to receive and frictionally hold a suitable card of paper, plastic or the like 18 on which may be written, typed, printed or otherwise illustrated some suitable word or symbol to identify a plant, flower, person or the like as indicated by the representations 20. A notch or cut out 22 is formed on the bottom 16 to facilitate the manual gripping of card 18 and within recess 14 to aid in holding the card 18 in place there is integrally formed on one side one or more ribs 23 (Figs. 3 and 4) that extend transversely of the longitudinal axis of the holder 10. Each rib 23 thus provides a restricted point in the recess 14 to frictionally yieldingly maintain a card 18 as shown in Fig. 5.

On the rear side of holder 10 (Fig. 2) there is preferably integrally formed or otherwise attached, a pair of spaced bearing members, ears, or supports 24. Members 24, on their inner sides which are oppositely disposed, are provided with a slot or groove 26 which extend transversely of the longitudinal axis of holder 10. Thus far described, it is pointed out that members 24 have a bottom edge 28 (Fig. 3) which extends upwardly and rearwardly from the plane of bottom 16 of holder 10 and thus by resting bottom 28 on a table 30 or other flat surface, the holder 10 is supported in easel-like fashion for displaying the data or identification 20.

Another means for supporting the holder 10 is illustrated in Fig. 1 where I have used an elongated wire holder 32 formed from a single strand which is bent at its center into a U shape so that its over all appearance is hair pin like and the upper or closed end portion is bent slightly as at bend points 34 so as to be disposed at an angle to the major lengths of the support 32 represented by the wire or rod lengths 36 and 38. The holder 10 is mounted to support 32 by squeezing the upper closed end portion of the support sufficiently to pass it between the ears 24 as shown in Fig. 2 and releasing it when it is positioned as shown in the solid lines. Upon such release, the respective upper portions of members 36 and 38 will because of their resiliency engage and frictionally nest in the respective grooves 26, and the angled position of the upper portion of holder 32 relative to the lower portion as represented by the bend points 34 provide a stop means against any tendency of the holder 10 to slide vertically. The free ends of members 36 and 38 are merely inserted in the soil 40 and thus arranged it will be appreciated that card 18 is adequately displayed and is amply protected from the elements.

Cards 18 are easily changed if desired, and likewise the holder 10 is easily mounted or removed from holder 32 so as to be usable in either of the forms illustrated. It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my marker without departing from the real spirit and purpose of my invention, and it is my intention to cover by my claims, any modified forms of structure or use of mechanical equivalents which may be reasonably included within their scope.

I claim:

1. A marker, comprising, an elongated transparent body member having a top and bottom edge, said body member provided with a recess closed on all sides but the bottom, a pair of spaced bearing ears integrally formed on one side of said body member, oppositely disposed sides of said bearing ears each having a groove extending in a direction between the top and bottom edge of said body member, an elongated hairpin shaped resilient rod support member having its closed end portion bent at an angle to its main length, said bent closed end portion yieldingly frictionally disposed in said respective grooves to support said body member with the open ends of said rod support member designed for insertion in the ground or the like, and the bend in said rod support member serving as the only stop means against the downward movement of said body member.

2. A marker, comprising an elongated transparent body member having a top and bottom edge, said body member integrally formed with a recess closed on all sides but the bottom, a pair of spaced ears integrally formed on and projecting from one side in parallel relationship, oppositely disposed sides of said ears each having a groove extending in a direction between the top and bottom edge of said body member, an elongated hairpin shaped resilient rod support member having its closed end portion bent at an angle to its main length, the spacing between said grooves being less than the normal spacing of the respective lengths of the closed end portion of said rod support member, said closed end portion of said rod support member compressed to yieldingly frictionally abut said respective grooves as the sole support means for said body member with the open ends of said rod support member designed for insertion in the ground, and the bend in said rod support member serving as the only stop means against the downward movement of said body member.

3. A marker, comprising an elongated transparent body member having a front and back side, said body member integrally formed with a recess closed on all sides but one, a rib integrally formed on one wall within said recess to provide a restricted area for frictionally engaging an identification card when inserted therein, a pair of spaced bearing ears integrally formed on the rear side of said body member, oppositely disposed sides of said bearing ears each having a groove, an elongated hairpin shaped resilient rod support member, and said closed end portion of said rod support member compressed to yieldingly frictionally abut said respective grooves as the sole support means for said body member with the open ends of said rod support member designed for insertion in the ground or the like.

References Cited in the file of this patent

UNITED STATES PATENTS

| | | |
|---|---|---|
| 419,605 | Hiller | Jan. 14, 1890 |
| 519,256 | Greene | May 1, 1894 |
| 528,545 | Krueger | Nov. 6, 1894 |
| 1,466,222 | Gillogly | Aug. 28, 1923 |
| 1,616,147 | Smiley | Feb. 1, 1927 |
| 1,863,633 | Melind | June 21, 1932 |
| 2,219,834 | Davis | Oct. 29, 1940 |
| 2,595,530 | Kuefner | May 6, 1952 |
| 2,629,952 | Garzan | Mar. 3, 1953 |